UNITED STATES PATENT OFFICE.

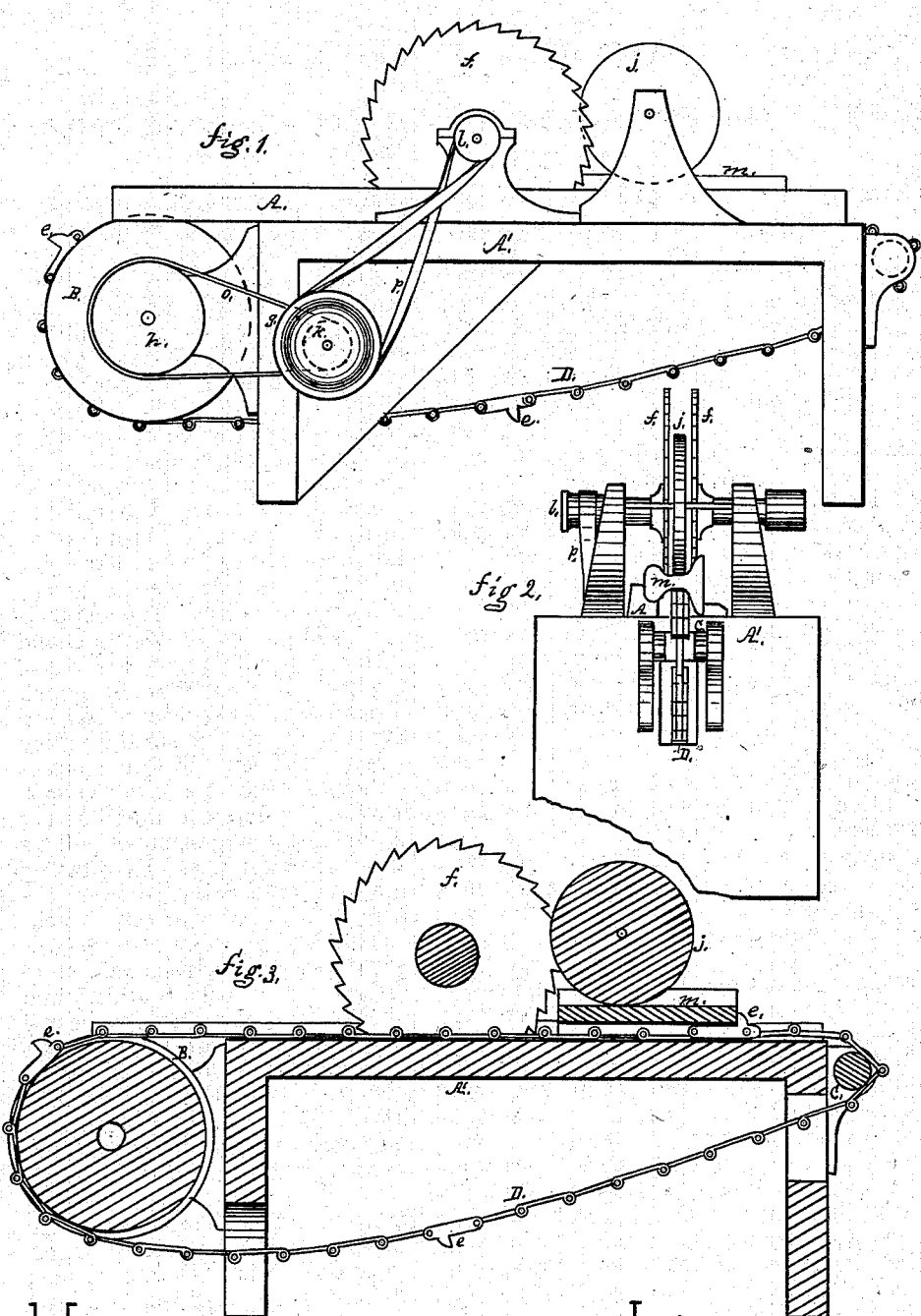

CHRISTOPHER R. JACOBY, OF PITTSBURG, PENNSYLVANIA.

IMPROVEMENT IN MACHINES FOR SAWING STEEL RAILROAD-RAILS.

Specification forming part of Letters Patent No. 186,423, dated January 23, 1877; application filed October 20, 1876.

*To all whom it may concern:*

Be it known that I, CHRISTOPHER R. JACOBY, of Pittsburg, in the county of Allegheny and State of Pennsylvania, have invented a new and useful Improvement in Machines for Cutting Railway-Rails; and I do hereby declare that the following is a full and exact description thereof, reference being had to the accompanying drawings, and to the letters of reference marked thereon.

My invention relates to an improvement in machine for cutting steel railway-rails; and consists of a table or frame on which is mounted in suitable bearings two adjustable circular saws, holding-wheel, and carrying-chain, which moves upon suitable grooved pulleys or wheels, arranged and operating with relation to each other, as will hereinafter more fully appear.

To enable others skilled in the art to make and use my invention, I will proceed to describe its construction and operation.

In the accompanying drawings, which form part of my specification, Figure 1 is a side elevation of my improvement. Fig. 2 is an end view. Fig. 3 is a vertical and longitudinal section.

Manufacturers have found great difficulty in utilizing worn-out railway-rails when constructed of Bessemer steel. The peculiar form of the T-rail which is now in general use renders the heating of them to the welding or forging point almost impossible. The neck or web of the rail, being thinner than the base and head, becomes heated first, and before the head of the rail is sufficiently heated for being drawn out by the action of the rolls or hammer, the edges of the base and web waste away by the action of the heat of the furnace, causing a very considerable loss of material. To avoid this loss and facilitate the reduction of the rail to other forms of merchantable steel is the object of my invention. I separate the rail into three parts by cutting it longitudinally by means of circular saws $f$, arranged upon a suitable axis, said saws being so arranged on the axle that the space between them may be increased or diminished at the will of the operator. In conjunction with the saws $f$ is used a pulley-wheel, $j$, which is used for holding the rail $m$ down on the way A, which is secured on the table or frame A', the web of the rail $m$ traveling under the the periphery of the wheel $j$, as represented in Figs. 2 and 3. The rail $m$ is carried forward to the saws $f$ by means of an endless chain, D, having carrying-links $e$, the projections of which catch against the end of the rail $m$, as shown in Fig. 3. The chain D travels over grooved pulleys or wheels B and C. I represents a belt-pulley, $h$, on the axis of the grooved wheel B, the belt $o$ of which passes around a pulley, $k$. (Represented by dotted lines in Fig. 1.) On the axis of the pulley $k$ is a belt-pulley, $g$, the belt $p$ of which passes around the pulley $l$ on the axis of the saws $f$. But I wish it clearly understood that I do not confine myself to this arrangement of pulleys for operating the several parts. By rotating the pulley $h$ by suitable driving-power, the grooved wheel B will be revolved, which, through the medium of the belts $o$ and $p$, will revolve the saws $f$, and cause the chain D to travel over the grooved wheels B and C, and the carrying-links $e$ will carry forward the rail $m$ to the saws $f$, which will cut the rail longitudinally into three parts, which can be cut into suitable lengths, heated and rolled with facility into the desired forms of bar-steel.

Having thus described the nature and object of my invention, what I claim as of my invention is—

The adjustable saws $f$, in combination with the wheel $j$, way A, and endless chain D, arranged and operating with relation to each other substantially as herein described, and for the purpose set forth.

C. R. JACOBY.

Witnesses:
A. C. JOHNSTON,
WESLEY JOHNSTON.